United States Patent [19]

Daniels et al.

[11] 4,179,169
[45] Dec. 18, 1979

[54] FACADE FOR A DATA PROCESSING SYSTEM

[75] Inventors: George R. Daniels, Phoenix, Ariz.; Helmut Henneberg, Canton, Mass.

[73] Assignee: Honeywell Information Systems Inc., Phoenix, Ariz.

[21] Appl. No.: 856,362

[22] Filed: Dec. 1, 1977

[51] Int. Cl.$^2$ .......................... A47B 43/00; H02B 1/06
[52] U.S. Cl. ........................... 312/257 R; 312/257 A; 361/335; 52/73
[58] Field of Search ........ 312/257 R, 257 A, 257 SK, 312/257 SM, 204; 361/334, 335; 52/73, 282

[56] References Cited

U.S. PATENT DOCUMENTS

| | | | |
|---|---|---|---|
| 2,816,330 | 12/1957 | Sherron | 52/73 |
| 2,885,600 | 5/1959 | Wiseman | 361/334 |
| 2,924,638 | 2/1960 | Feketics | 52/282 |
| 2,952,799 | 9/1960 | Wortman et al. | 361/335 |
| 3,300,078 | 1/1967 | Stanback | 312/257 R |
| 3,485,405 | 12/1969 | Dement | 52/282 |
| 3,771,847 | 11/1973 | Aylworth | 312/138 |
| 3,832,605 | 8/1974 | Clark, Jr. | 312/257 SM |
| 3,919,603 | 11/1975 | Salvati et al. | 312/257 SK |

Primary Examiner—Victor N. Sakran
Attorney, Agent, or Firm—W. W. Holloway, Jr.; R. T. Reiling; N. Prasinos

[57] ABSTRACT

A facade for enclosing data processing apparatus or similar equipment. The facade is designed to be a freestanding unit, enclosing completely a multiple-component data processing assemblage. However, the facade can also be utilized in conjunction with external structural members, such as existing walls, to enclose the assemblage. The facade is easily assembled and disassembled by available field personnel, but has sufficient structural integrity to provide protection for the enclosed equipment assemblage and to prevent casual entry into the interior. In addition, the facade has sufficient apertures to permit disapation of heat generated by the high circuit element density utilized in the modern data processing apparatus. The facade is arranged to permit easy access by the maintenance personnel to the interior of the facade. The facade eliminates the necessity for the the exterior cabinetry normally utilized by the individual data processing units, thus the ability to open the facade at numerous locations can permit the maintenance personnel direct access to electronic components of the data processing units. The facade contains a raised false floor, in order to provide a method of electrically coupling the units without having the coupling exposed. Ramps are provided to permit the entry of test equipment. The interior area enclosed by the facade is capable of expanding or contracting, depending on the requirements and amount of data processing equipment required by the site.

13 Claims, 11 Drawing Figures

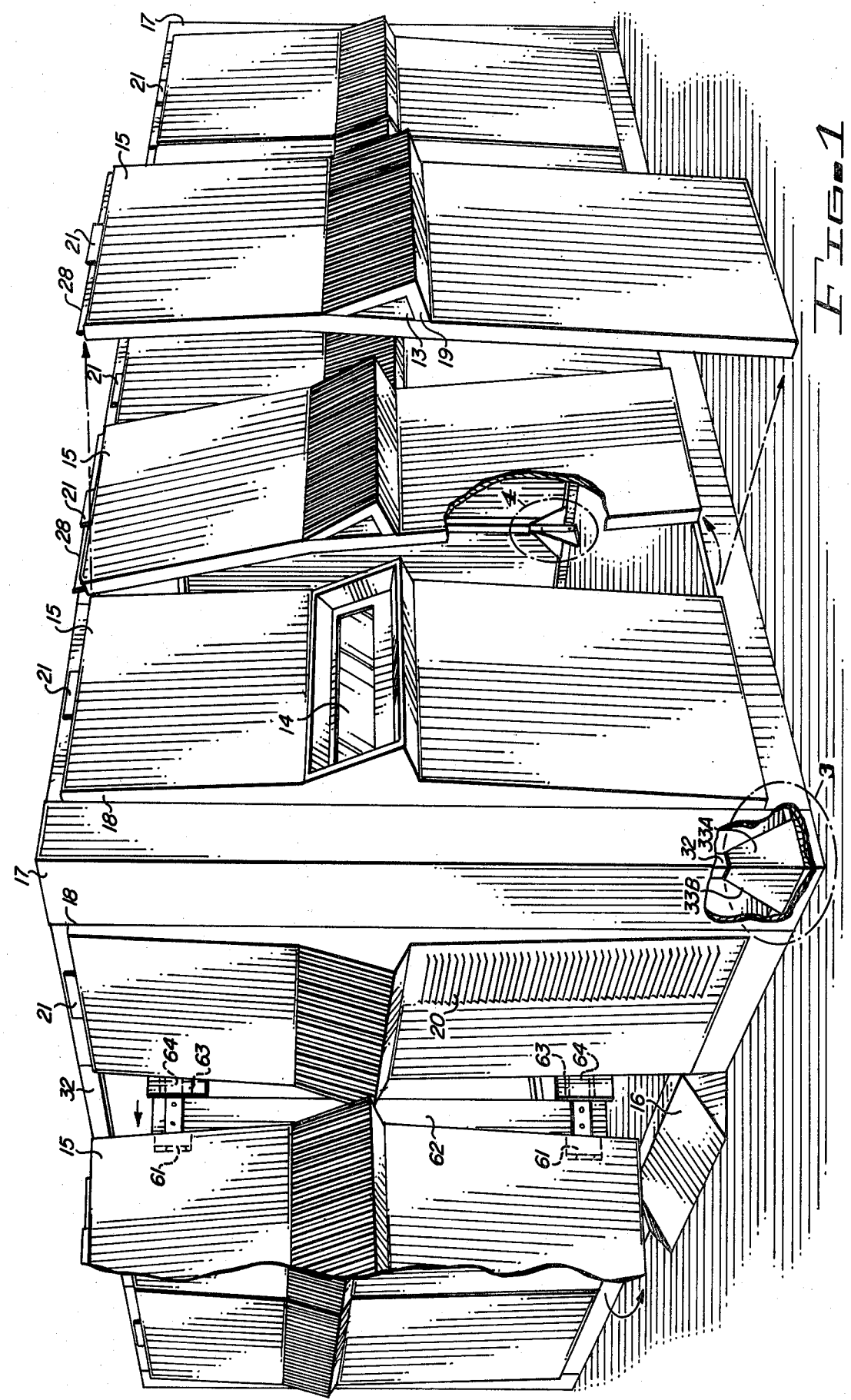

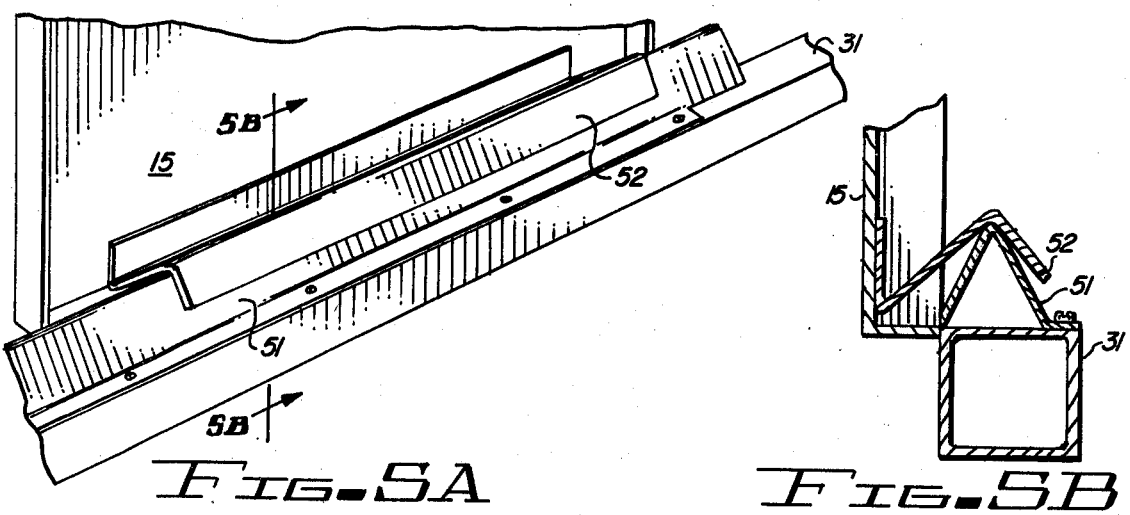
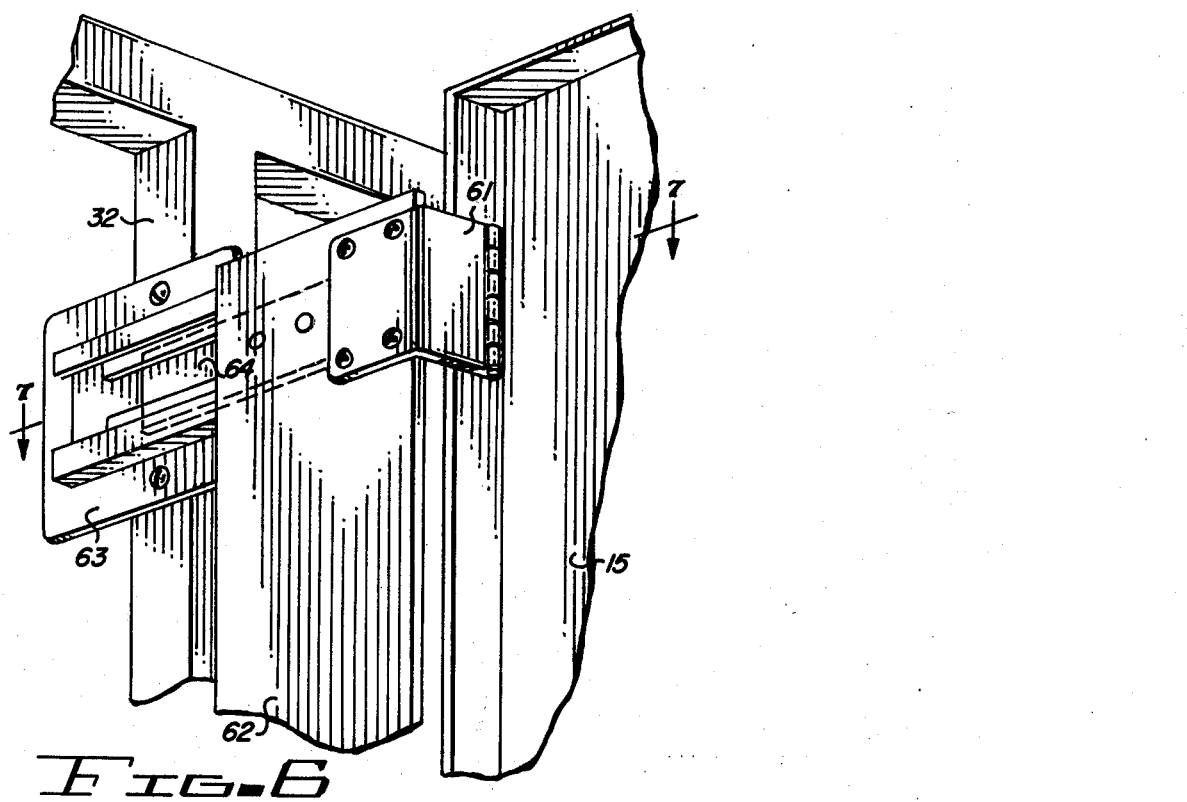
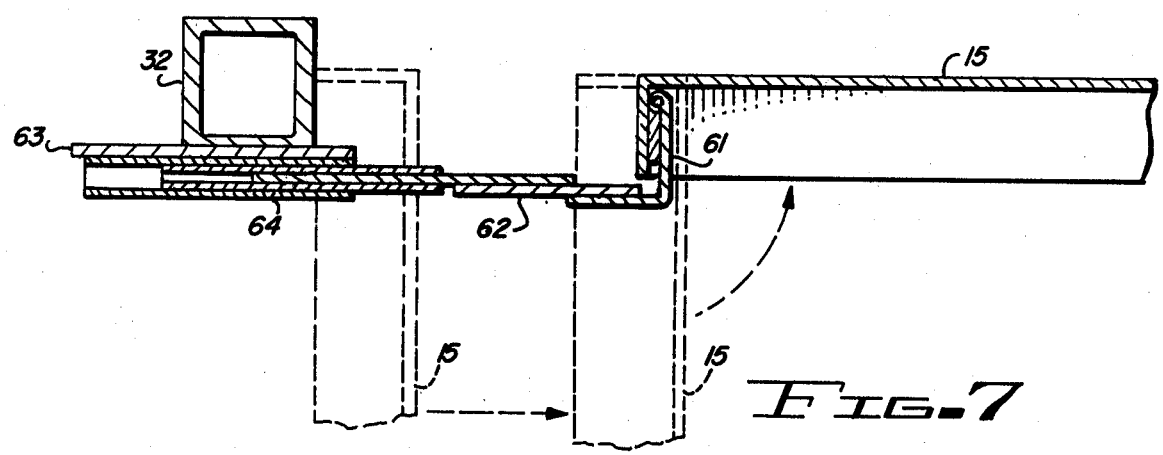

FACADE FOR A DATA PROCESSING SYSTEM

BACKGROUND OF THE INVENTION

1. Field of the Invention

This invention relates generally to the packaging of data processing systems and more particularly to the packaging of large data processing systems having a plurality of independent units.

2. Description of the Prior Art

As data processing systems have become increasingly complex, the number of cabinets containing electronic components has increased, notwithstanding the miniturization of the individual components brought about by technical innovation. In general, the packaging of the multi-unit assemblage of components has been accomplished by packaging the individual cabinets. Thus each unit of the assemblage of data processing apparatus must be packaged with sufficient structure to prohibit casual access to the components. Further, when there was maintenance to be performed on the units, the possibility of casual access again becomes possible.

The individual cabinets also have the advantage of permitting considerable flexibility in the interchange and in the arrangement of the individual units of the data processing assemblage. However, the individual cabinets must be electrically coupled. It is often desirable to make the length of the electrical coupling as short as possible, thereby minimizing signal transit times between units. This requirement may conflict with requirements regarding safety and appearance for the area containing the data processing apparatus.

In order to minimize the exposed electrical coupling members, it can be desirable to provide a false flooring and permit the coupling members to be positioned out of the way of traffic. Because the general area containing a data processing system may not contain a false floor, one can be easily installed. However, with the presence of casual persons in the system, the possibility of accidents in making the transition from or to the platform can become important, particularly when distracted by the components of the data processing system.

The packaging of the individual unit of a data processing system is such that access to the rear of the cabinet is frequently necessary for maintenance purposes. In prior art, if the data processing system was enclosed, it was therefore necessary to provide a path of sufficient magnitude for the purposes of permitting maintenance personnel to service the apparatus.

One solution to the problem raised above has been to provide a room dedicated to the data processing system to which only maintenance personnel have access. This was frequently inconvenient or an inefficient use of space. Furthermore, because of the expense of the modern data processing equipment, it is desirable from a public relations point of view to be able to exhibit the data processing system.

It is therefore an object of the present invention to provide a facade for enclosing a multi-unit data processing system.

It is a further object of the present invention to provide a facade for enclosing a multi-unit data processing system which can be assembled and disassembled conveniently.

It is still a further object of the present invention to provide a facade for enclosing a multi-unit data processing system which provides easily removable panels for easy access to the individual data processing units.

It is yet another object of the present invention to provide a facade for enclosing a multi-unit data processing system which has an entrance unit which can be positioned to deny casual access, while still indicating the presence of personnel in the interior of the enclosure.

It is still another object of the present invention to provide a facade for enclosing a multi-unit data processing system wherein the enclosure can be conveniently modified.

It is yet a further object of the present invention to provide a modifiable facade for enclosing a multi-unit data processing system which can be constructed from standard units.

SUMMARY OF THE INVENTION

The aforementioned other objects of the present invention are accomplished, according to the present invention, by providing a group of standardized elements which can be assembled to provide a facade superstructure, a plurality of panels constructed to be detachably mounted on the facade superstructure, and an entrance unit which permits access to the interior of the facade. The panels and the superstructure are arranged so that the panels can be easily removed from the superstructure and the panels can be stored by hanging them on an adjacent panel-superstructure region.

The entrance is arranged to permit a panel, identical to the other panels, to be swung open after the entrance panel has first been brought forward from the facade wall by means of sliding members. The ability to bring the entrance panel forward while maintaining in a position so that entry is not possible allows an observer on the exterior of the facade to be apprised that someone is in the enclosure.

The structural units have dimensions so that each panel is roughly the size of a cabinet comprising the multi-unit data processing system and the structural unit can be constructed to support one of a plurality of panels. Thus each cabinet can be positioned, without the protective metal coverings in close proximity to a panel of the facade. By removing the panel coupled to the facade, the interior of the cabinet adjacent to the location from which the panel has been removed can be serviced.

These and other features of the invention will be understood upon reading of the following description along with the drawings.

BRIEF DESCRIPTION OF THE DRAWINGS

FIG. 1 is a perspective view of the facade for enclosing a data processing system according to the present invention with cutaway portions to show structural details;

FIG. 5A and FIG. 5B are perspective and side cross-sectional views respectively of the coupling of a lower portion of a facade panel to the facade superstructure;

FIG. 6 is a perspective view of the coupling of a facade entrance panel to a facade superstructure; and FIG. 7 is a top cross-sectional view of the coupling of a facade entrance panel to a facade superstructure.

DESCRIPTION OF THE PREFERRED EMBODIMENT

Detailed Description of the Figures

Figure 2A:
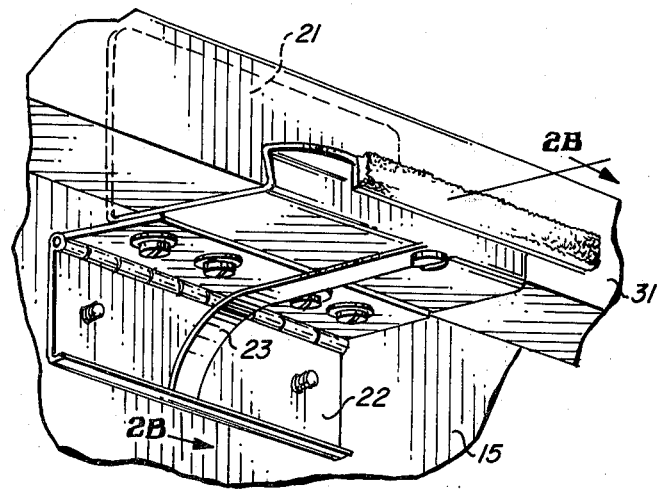
FIG. 2A and FIG. 2B are perspective and side cross-sectional views respectively of the latch mechanism for coupling a top portion of a panel to the facade superstructure.

Referring now to FIG. 1, a perspective view of the facade for enclosing a multi-unit data processing system according to the preferred embodiment of the present invention is shown. The facade includes a superstructure, a plurality of facade panels 15 detachably coupled to the superstructure, corner plates 17, for covering the superstructure on the corners of the facade and panel plates 18, which conceal the protruding sides of panels adjacent to the facade corners. According to the preferred embodiment one panel, typically a panel near the corner has a display structure 14 which is devoted to displaying status indicator signals and can contain switching apparatus.

The facade panels 15 have a release plate 21 portion of the latch mechanism, which secures the facade panels 15 to the superstructure, protruding above the facade panels 15. To release the facade panel 15 from the superstructure, release plate 21 is pushed forward across restraining plate, releasing the upper portion of the panel. The lower portion of the panel has a groove structure which rests on a protuberance of the superstructure. Thus, in distinction to the illustration in FIG. 1 showing the bottom of the panel swinging out, typically the top portion of the facade panel 15 would be the first portion to swing out in removing a panel. Structure 20 on the facade panel indicates that aperatures for the circulation of air are fabricated as part of the panels. Each panel 15 has a protruding member 19 attached thereto. Protruding member 19 has hand-holds 13 for convenient handling of the panels.

The entrance structure for the enclosure is shown on the left hand portion of the FIG. 1. Elements 61, 62, 63, and 64 permit the facade panel forming part of the entrance structure to be pulled away from the plane of the facade and then swung to permit entrance. Entrance facade panel 15 when in a closed position can be identified by the ramp 16. In the preferred embodiment, a false floor, comprised of a series of standardized sections are level with the lower part of the facade superstructure. Thus the ramp permits (test) apparatus to be raised onto the false floor.

Area 3 of FIG. 1 is a cutaway portion showing the general construction of a corner portion of the superstructure. Area 4 of FIG. 1 shows the general structure of a portion of the superstructure in a middle portion of the facade.

Figure 2B:
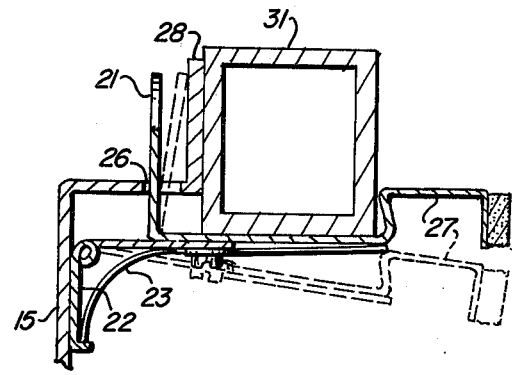

Referring now to FIG. 2A and FIG. 2B, the structure of the latch mechanism securing the upper portion of a facade panel 15 to the facade superstructure is shown. Horizontal tube member 31 is a portion of the upper facade superstructure to which the facade panel is to be coupled. Attached to an interior portion of the facade panel 15 is a hinge member 22. Coupled to the two portions of hinge member 22 is a spring 23 which provides a force keeping the hinge in an open condition. Attached to the hinge is release plate 21. Release plate 21 actually protrudes through an aperture in the panel 15 and restraining plate 28 is an integral part of plate 15 in the preferred embodiment. The freedom of the hinge portions to open is limited by the contact of the release plate 21 at location 26 shown in FIG. 2B. The release plate is structured so that horizontal tube structure 31 is captured thereby. When the facade panel is coupled to the facade superstructure to release a facade panel from the facade panel, pressure is applied between the portion of the release plate extending above the panel (of FIG. 1) and the restraining plate. This pressure causes the release plate, acting against the hinge member coupled to the release plate and therefore to spring 23, to cause a portion of the release plate 26 to be lowered below the horizontal structure member 31, and permitting the panel to be moved away from the facade. In addition, in the preferred embodiment, the release plate 21 has an inverted-U structure 27. This structure, not correctly proportioned in the drawings, permits a facade panel 15 to be hung on the facade superstructure on the front of a facade panel 15 already coupled to the superstructure. This feature provides convenient temporary storage for a facade panel which has been temporarily removed.

Figure 3A:
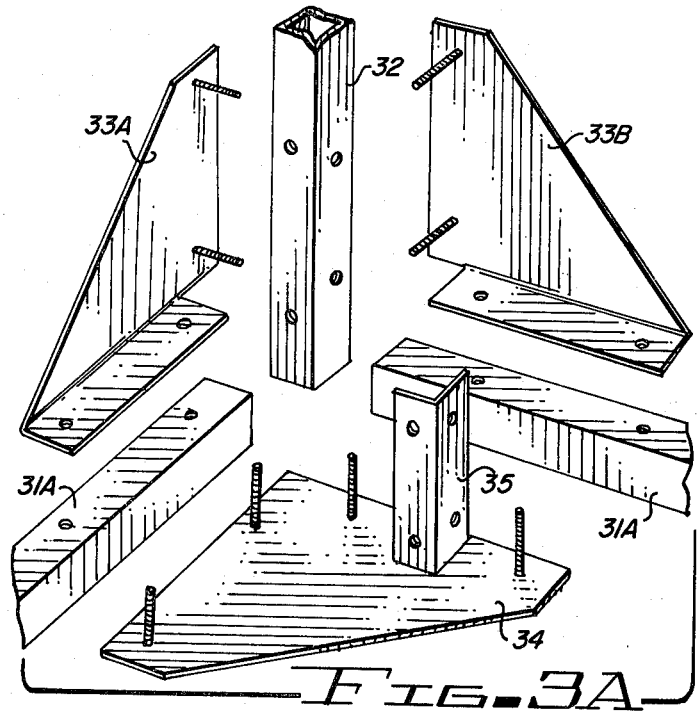
FIG. 3A and FIG. 3B are exploded and assembled perspective views respectively of a construction of corners of a facade superstructure.
Figure 3B:
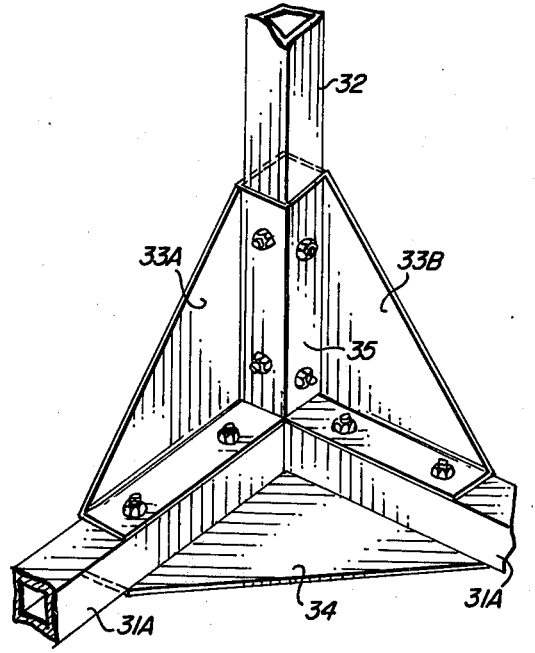

Referring next to FIG. 3A and FIG. 3B, the construction of a corner superstructure assembly of the superstructure is shown. The corner assembly is comprised of a base plate 34, two corner side plates 33A and 33B, and a corner face plate 35. A portion of vertical structural member 32 and portions of horizontal structural members 31A are shown. In FIG. 3A an exploded view of the corner assembly is shown and in FIG. 3B an assembled view of the corner assembly is shown. Base plate 34 has bolts attached thereto. In the assembled corner, nuts attached to the base plate bolts secure horizontal structure members 31A between the base plate 34 and corner side plates 33A and 33B. Similarly, nuts placed on bolts attached to corner side plates 33A and 33B secure a vertical structure member 32 between the corner side plates and the corner face plate 35.

Figure 4A:
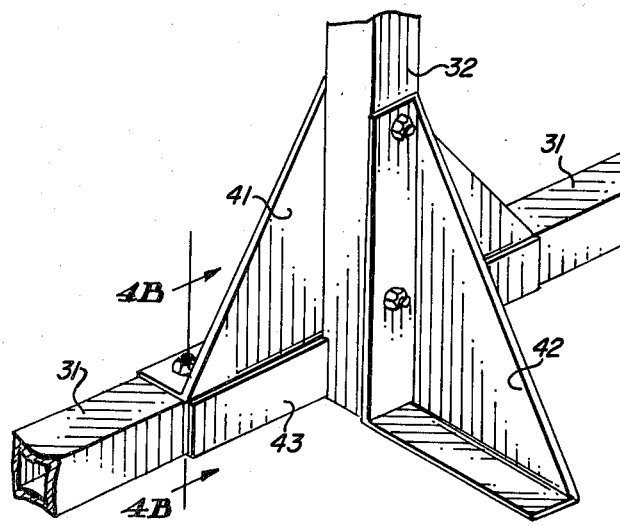
FIG. 4A and FIG. 4B are an assembled perspective view and a cross-sectional view of a middle connection of the facade superstructure.
Figure 4B:
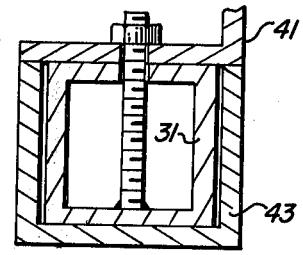

Referring next to FIG. 4A and FIG. 4B, a middle superstructure assembly is shown in an assembled and cross-sectional view. A U-shaped middle member 43, for containing the end portion of two horizontal structural members 31 (or 31A) has bolts attached thereto. The bolt, with nuts attached, secure the horizontal structure members between the middle member 43 and middle face 41. Middle face plate 41 has two bolts attached thereto. Nuts applied to the bolts can secure vertical structural member 32 to the face plate. Support member 42 contains two aperatures for receiving the bolts and the vertical structure member 32 can be secured between a middle face 41 and a support member 42. For coupling of a vertical member 32 to an upper horizontal member 31 of the super structure, support member 42 is not needed.

Referring now to FIG. 5A and FIG. 5B, a perspective and a cross-sectional view of the attachment of the lower portion of a facade panel 15 to the facade superstructure is shown. In the rear of each facade panel 15, a grooved member 52 is attached thereto. The lower horizontal structure member 31 has raised structure 51 coupled thereto, which can be engaged by grooved member 52. In the preferred embodiment, each panel 15 is constructed to include grooved member 52 as an integral part thereof. When the latch mechanism is coupled to an upper vertical superstructure member and raised structure 51 is coupled to a lower horizontal structure member 31 which engages grooved member 52, then the facade panel 15 is secured to the facade superstructure. To release a facade panel, the latch mechanism is released and the facade panel 15 can be tilted outward and lifted from raised structure 51.

Referring next to FIG. 6 and FIG. 7, a perspective and a top cross-section view of the assembly attaching the facade panel serving as an entrance to the interior of the facade is shown. A support panel 63 is attached to a vertical structure member 32. (The coupling of the vertical member 32 to the horizontal member is not shown in detail.) Attached to support panel 63 is a telescoping assembly 64. In the preferred embodiment telescoping assembly 64 is a nested set of horizontally moveable members, each member sliding past the adjacent members by means of ball bearings in grooves. The telescoping assembly 64 is also coupled to vertical support member 62. Vertical support member is coupled to hinge mechanism 61 which in turn is coupled to facade panel 15. When the telescoping assembly is extended, facade panel 15 can be positioned between a position parallel to the facade superstructure and right angles to the facade superstructure (i.e., when entrance to the facade interior is desired).

In the preferred embodiment, two assemblies of the type described above are utilized and the vertical support member couples the assemblies together. On the other side of facade panel 15 (not shown) is a third assembly attaching the entrance facade panel to the facade superstructure. This assembly differs from that shown in FIG. 6 and FIG. 7 in that it is not a load-bearing assembly. And hinge 61 is replaced by a simple latch mechanism which engages a structure of facade panel 15. For entrance to the facade interior, this latch mechanism is released, when the telescoping assemblies 64 are at least partially extended and the facade pivoted on hinges 61.

Operation of the Preferred Embodiment

As will be clear to those skilled in the art the present facade is conveniently assembled by two people and when necessary can be assembled by a single individual at a site location. For example, a lower and upper corner assembly can be undertaken, which is capable of standing alone. Next the lower middle assemblies are added until the facade reaches the desired size. Then two corner assemblies are added. Finally the two remaining side lower middle assemblies can be erected and the fourth corner assemblies undertaken. Next the upper middle assemblies can be undertaken. In general it is not necessary to handle more than one structural element at a time, so that the assembly can be undertaken by one person. Similarly, the facade can be disassembled or the dimensions changed with relative ease.

There are a minimum number of individual parts. The vertical structure members 32 are all the same length. The horizontal structure members come in two lengths. That length for the normal unit of facade structure and that length for the corner horizontal structure member 31A. The corner horizontal structure members are somewhat longer because of the presence of corner plates 17. However, it can be convenient in certain installations to have horizontal structure members 31 be generally a multiple of the panel dimensions, and thus multiple panels can be supported on each section.

As will be clear to those skilled in the art, the aperatures for receiving the bolts from one corner side plate, as well as the bolts attached to the corner side plate are off-set from the bolts corresponding vertical member aperature of the second corner side plate.

The upper corner assemblies are identical with the lower corner assemblies although they may be inverted. The middle assemblies of the upper superstructure does not require the presence of support member 42 which provides lateral stability of the facade superstructure.

The facade panels 15 are formed of aluminum in the preferred embodiment, and the attached protruding members 19 are molded plastic. Combined, the structural integrity and the relatively light weight permits them to be handled by a single person. The vertical structural members 31 are approximately the same length as the width of the facade panels. This dimension is selected to permit a unit of the data processing assembly to be located generally behind a single facade panel.

The structure members are tubing which combines a relatively light weight with structural integrity.

The entrance facade panel to the facade interior has two closed positions. The first closed position is in the plane of other facade panels on that side of the structure, while the second position is extended from that plane. The second position is utilized to prevent casual penetration of the facade interior while still alerting personnel outside of the facade of a person (or persons) in the facade by casual inspection.

The false platform on the interior is roughly the same height as the lower portion of the facade superstructure. The platform, in the preferred embodiment, is comprised of units which have the same dimensions. As the facade dimensions are changed, the platform units can be similarly changed. Because casual intruders are excluded by the facade, greater freedom can be permitted in the electrical coupling between individual units. Because only experienced maintenance personnel can enter, bridges of electrical coupling members can be utilized that would be unacceptable with greater accessability.

The facade permits maintenance personnel to work with relatively few interruptions while in the interior of the facade. If it becomes necessary to remove a panel for access to a piece of apparatus, only that portion which is currently being attended need be exposed at any time, because of the ease of removal and replacement of the facade panels. During the period of maintenance, a generally pleasing appearance of the data processing installation can still be maintained.

The above description is included to illustrate the operation of the preferred embodiment and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A facade structure for enclosing data processing units comprising:
   a superstructure having at least two walls being generally perpendicular, wherein each of said walls is comprised of unit sections and sections which are multiples of said unit sections, said superstructure walls being comprised of vertical and horizontal members,
   a plurality of panels each including a release mechanism and capable of being detachably coupled to said super-structure, each of said panels having a dimension generally equivalent to said unit section dimension, wherein each of said panels is supported by a lower horizontal member and is coupled to an upper horizontal member by said release mechanisms, said panels being uncoupled from said superstructure by pressure applied to said release mechanisms; and at least one entrance unit, said entrance unit including a one of said panels, said entrance unit having a first closed configuration with said entrance unit panel in a position in a plane formed by panels coupled to said superstructure;

said entrance unit having a second closed configuration with said entrance unit panel in position in front of a plane formed by panels coupled to said superstructure, said entrance unit having an open configuration permitting access to an interior of said facade structure.

2. The facade structure of claim 1 wherein said superstructure is comprised of a first assembly structure occurring at corners of said superstructure and a second assembly structure for coupling portions of the superstructure in non-corner positions.

3. The facade structure of claim 1 wherein each of said vertical structure members are generally equal in length, and wherein each of said horizontal structure members are selected from a one of two lengths.

4. The facade structure of claim 1 where said panels can be stored on said superstructure resting on a panel coupled to said superstructure.

5. The facade structure of claim 4 further including a display panel for displaying status information relating to said data processing units enclosed by said facade structure.

6. A facade for enclosing a plurality of electronic units comprising:

a superstructure with at least two walls including
a first multiplicity of horizontal members;
a second multiplicity of vertical members;
a third multiplicity of wall coupling units for coupling a two of said horizontal and a one of said vertical members on a wall of said superstructure; and
a fourth multiplicity of corner coupling units for coupling two of said horizontal members and a one of said vertical members at a corner of said superstructure;
a fifth multiplicity of panels for detachably coupling to said superstructure, wherein said panels include a latch mechanism for engaging an upper portion of said panel to said superstructure, and wherein at least one edge of said coupled panels is positioned adjacent to a one of said vertical members, wherein each of said panels can be released from said superstructure by pressure applied to said latch mechanism; and an entrance unit including a one of said panels, wherein said entrance unit has a first closed position with said entrance unit panel coupled to said superstructure, wherein said entrance unit has a second closed position with said entrance unit panel not coupled to said superstructure.

7. The facade of claim 6 wherein the width of said panels is determined by dimensions of said electronic units.

8. The facade of claim 6 wherein said panels can be hung on said superstructure while simultaneously resting on a coupling panel.

9. The facade of claim 6, wherein each of said panels has a protruding member coupled thereto, and wherein at least one of said protruding members can include a display unit.

10. A wall for enclosing electronic units including a superstructure;
a multiplicity of panels detachably coupled to said superstructure, wherein said panels can be removed from said superstructure for servicing of said electronic units, wherein each of said panels can be detached from said superstructure by pressure applied to a protruding structure of said panel; and
an entrance unit including a one of said panels, said entrance unit panel having a first closed position for preventing access to an interior of enclosing wall, a second closed position for preventing access to said interior while demonstrating a possible presence of personnel in said interior, and an open position for permitting access to said interior.

11. The wall of claim 10 wherein said superstructure can be altered in units or multiples of the width of said panel.

12. The wall of claim 10 wherein a one of said panels includes a display unit for indicating a status electronic units in said superstructure.

13. The wall of claim 10 wherein said superstructure can be assembled by a single person, and said panels coupled to said superstructure by a single person.

* * * * *